United States Patent [19]

Russell

[11] 4,338,269

[45] Jul. 6, 1982

[54] METHOD OF FORMING AN ABRASION-RESISTANT COATING ON MOLDED ARTICLES

[75] Inventor: Raymond J. Russell, Lincoln Park, N.J.

[73] Assignee: Panelgraphic Corporation, West Caldwell, N.J.

[21] Appl. No.: 213,479

[22] Filed: Dec. 5, 1980

[51] Int. Cl.³ ................................................. C08F 2/48
[52] U.S. Cl. ............................... 264/22; 204/159.16; 264/236; 264/309; 264/338
[58] Field of Search ................... 264/22, 1.4, 338, 25, 264/236, 309; 204/159.16, 159.2

[56] References Cited

U.S. PATENT DOCUMENTS

| | | | |
|---|---|---|---|
| 3,645,984 | 2/1972 | Dowbenko et al. | 204/159.16 |
| 3,968,309 | 7/1976 | Matsuo et al. | 264/1.4 |
| 3,978,178 | 8/1976 | Oshima et al. | 264/338 |
| 4,165,267 | 8/1979 | Avar et al. | 204/159.16 |
| 4,199,421 | 4/1980 | Kamada et al. | 264/22 |
| 4,273,799 | 6/1981 | Kamada et al. | 264/22 |
| 4,273,802 | 6/1981 | Kamada et al. | 264/22 |
| 4,274,933 | 6/1981 | Kamada et al. | 264/22 |

*Primary Examiner*—Jeffery R. Thurlow
*Attorney, Agent, or Firm*—Ronald G. Goebel

[57] ABSTRACT

The present invention provides a method of forming a coating on molded polymeric articles formed by curing a polymerizable monomer-containing molding composition in a mold comprised of a material having less bonding affinity for the abrasion-resistant coating than for the cured molding composition. The method comprises:

(a) applying to a mold a coating composition comprising a pentaerythritol based polyacrylate or polmethacrylate and, a cellulose ester or a vinyl chloride-vinyl acetate containing copolymer;
(b) exposing said coating composition to actinic radiation to form a cured coating;
(c) adding to the mold a heat polymerizable monomer-containing molding composition; and
(d) polymerizing said molding composition in the form of a molded article, said cured coating bonding to the surface of said molded article.

9 Claims, No Drawings

METHOD OF FORMING AN ABRASION-RESISTANT COATING ON MOLDED ARTICLES

BACKGROUND OF THE INVENTION

This invention is concerned with a method of forming an abrasion-resistant coating on molded polymeric articles.

In Japanese Pat. No. 74-45965 issued May 2, 1974 a method is described for providing an abrasion-resistant coating on a molded article formed by curing a polymerizable monomer-containing molding composition in a mold. The method comprises applying a film of a coating composition comprising low viscosity polymerizable monomers such as trimethylolpropane triacrylate, butanediol diacrylate and benzoin methyl ether to the inside surface of a glass mold, exposing said coating composition to UV radiation first in a nitrogen atmosphere and then in air to form a cured coating in the mold, adding to the mold a molding syrup comprising methyl methacrylate monomer and azobisisobutyronitrile; and heating said mold to polymerize said molding composition in the form of a molded article, whereby the cured coating is transferred from the glass mold surface to the molded article.

The present invention provides a method for coating a molded article in situ with a radiation curable coating composition comprising a pentaerythritol-based polyacrylate or polymethacrylate and a cellulose ester or a vinyl chloride-vinyl acetate containing copolymer. The composition when applied in the method can be cured without the necessity of a nitrogen or other inert atmosphere to provide a highly abrasion-resistant coating on the formed article which is also resistant to solvents and chemicals.

SUMMARY OF THE INVENTION

The present invention provides an improved method of forming an abrasion-resistant coating in situ on molded polymeric articles formed by curing a polymerizable monomer-containing molding composition in a mold. In this method a radiation curable coating composition is first applied to the mold surface and radiation cured in an air atmosphere. The molding composition is then added to the mold and cured to form a molded article by heat or aging during which the cured coating composition is transferred from the mold to the article surface. The invention applies to curable molding compositions which are cured in a mold comprised of a material such as metal, glass or plastic for which the abrasion-resistant coating has less bonding affinity than the cured molding composition.

The method comprises:

(a) applying to a mold a radiation curable coating composition comprising a pentaerythritol-based polyacrylate or polymethacrylate and a cellulose ester or a vinyl chloride-vinyl acetate containing copolymer;

(b) exposing said coating composition to actinic radiation to form a cured coating;

(c) adding to said mold a polymerizable monomer-containing molding composition; and (d) polymerizing said molding composition in the form of a molded article, said cured coating bonding to the surface of said molded article.

DETAILED DESCRIPTION OF THE PREFERRED EMBODIMENTS

In the first step of the method a radiation curable coating composition comprising a pentaerythritol-based polyacrylate or polymethacrylate and a cellulose ester or a vinyl-chloride vinyl acetate containing copolymer is applied to the inside surface of a mold having a cavity in the shape of the article to be coated.

The coating composition useful in this invention are curable by actinic radiation, such as ultraviolet light. In most cases a photoinitiator is employed to initiate polymerization. When applied to most any substrate, particularly polymeric substrates such as polycarbonates, polyvinyls and polyacrylics, polystyrene, polyesters, polyamides, epoxy resins, acrylonitrilebutadiene-styrene terpolymers, and cured, these compositions form extremely high abrasion-resistant coatings.

The pentaerythritol-based polyacrylates and polymethacrylates of the coating compositions useful in this invention include tri- and tetraacrylates and methacrylates of pentaerythritol as well as polyacrylates and polymethacrylates of di- and tri- pentaerythritols such as dipentaerythritol hexaacrylate, dipentaerythritol pentaacrylate and tripentaerythritol octaacrylate. Pentaerythritol tetraacrylate is particularly preferred due to its high performance in imparting abrasion-resistance to the final, cured compositions. It has been found that in the case of dipentaerythritol-based polyacrylates, particularly dipentaerythritol pentaacrylate, that no photoinitiator is required.

The cellulose esters of this invention comprise the reaction product of cellulose with at least one organic carboxylic acid having from about 2 to 4 carbon atoms or nitric acid. the preferred cellulose esters are cellulose acetate butyrates containing on the average from about 15% to 50% butyrl groups, from about 1% to 30% acetyl groups and from about 1% to 5% hydroxyl groups and preferably having a viscosity in Poises of from about 50 to 200 at 25° C. in a solution comprising 20 wt.% cellulose ester, 72 wt.% acetone and 8 wt.% ethyl alcohol. Particularly preferred is a cellulose acetate butyrate containing on the average 37% butyryl groups, 13% acetyl groups and 2% hydroxyl groups and having a viscosity in Poises of from about 64 to 124 at 25° C. in the above described solution. Nitrocellulose may also be employed as the cellulose ester.

The preferred vinyl chloride vinyl acetate containing copolymers are partially hydrolyzed vinyl chloride-vinyl acetate copolymers containing from about 50% to 95% combined vinyl chloride monomer, from about 2% to about 35% combined vinyl acetate monomer and from about 3% to about 25% combined vinyl alcohol. Particularly preferred is a partially hydrolyzed vinyl chloridevinyl acetate copolymer containing 91% combined vinyl chloride, 3% combined vinyl acetate and 6% combined vinyl alcohol. A detailed explanation of the preparation of said copolymers can be found in U.S. Pat. No. 2,512,726 herein incorporated by reference.

Other vinyl chloride-vinyl acetate containing polymers useful in this invention include vinyl chloride-vinyl acetate copolymers modified with alpha-beta unsaturated olefinic carboxylic acids or epoxy compounds. The carboxylic acid modified vinyl copolymers are prepared by copolymerizing vinyl chloride monomer and vinyl acetate monomer in the presence of small quantities, e.g. up to 10% by weight, of the alpha-beta unsaturated acid or acid derivative in the presence of a catalyst. Exemplary of such acid or acid derivatives are maleic acid, maleic anydride, monoesters of maleic acid, acrylic acid and methacrylic acid. Such modified vinyl copolymers are described in U.S. Pat. No. 2,329,456.

A vinyl chloride-vinyl acetate copolymer, unmodified and unhydrolyzed, may also be employed in this invention provided it is compatible with other components used in the coating composition, e.g. solvents, and additives.

A photoinitiator is added to the composition to initiate cross-linking or curing of the compositions upon irradiation. Such photoinitiators are well known in the art and include such compounds as benzoin, benzoin methylether, diphenyl disulfide, dibenzyl disulfide, benzil, benzophenone, xanthane, acetophenone, anthraquinone, Michler's ketone and the like. A preferred photoinitiator is alpha-chloro acetyl diphenyl oxide. An accelerator such as tertiary amine may also be added. As previously mentioned, in the case of dipentaerythritol-based coating compositions a photoinitiator need not be added.

The compositions of the present invention may be applied to the mold in any conventional manner such as by spraying, dipping, brushing or by roller, gravure, spin or flow coating techniques. Spraying is preferred since it allows uniform application of thin cured coatings to the substrate, i.e. on the order of 0.1 to 1.5 mils.

In order to facilitate mixing of the elements of the coating composition and to allow for efficient spraying, one or more solvents may also be employed in the composition, which include lower alcohols having from 1 to 4 carbon atoms such as propanol and butanol; lower alkyl acetates having from 4 to 6 carbon atoms such as propyl and butyl acetate; alkyl ketones having from 3 to 7 carbon atoms such as methyl isoamyl ketone; and ethylene glycol lower alkyl ethers (Cellosolves) such as methyl and ethyl Cellosolve. Organic solvents other than those named above may also be employed provided they are good solvents for the pentaerythritol-based polyacrylate or polymethacrylate cellulose ester or vinyl chloride-vinyl acetate containing copolymer and do not attack the mold material to which the composition is applied.

The coating compositions can be prepared by first forming a heavy solution of the cellulose ester or vinyl chloride-vinyl acetate containing copolymer in one or more solvents at about 10% to 15% by weight. A portion of this solution and the pentaerythritol-based polyacrylate or polymethacrylate is added to a further solvent system containing for example, propanol, propylacetate, butylacetate, methyl isoamyl ketone and methyl Cellosolve to provide a sprayable coating composition which preferably provides a weight ratio of pentaerythritol tetraacrylate to cellulose acetate butyrate of about 10 to 1 or to partially hydrolyzed vinyl chloride-vinyl acetate copolymer of about 8 to 1.

The weight ratio of pentaerythritol-based polyacrylate to copolymer or cellulose ester is an important factor in determining the abrasion-resistance of the final cured coating. The presence of the cellulose ester or copolymer also solves some critical problems associated with air curing of the polyacrylate, and in avoiding tacky, dust adhering films prior to curing. For example, curing a thin film of pentaerythritol tetraacrylate alone, which is a liquid, in an air atmosphere does not result in an appreciably abrasion-resistant, dry film. The tackiness or wetness of the liquid film during curing picks up dirt and dust due to the inhibition of the acrylate cure by oxygen in the air. Moreover, the thinner the film, the less the abrasion-resistance. Cured films of pentaerythritol tetraacrylate are also brittle. If, on the other hand, a thin film of pentaerythritol tetraacrylate is cured in an inert atmosphere excluding oxygen, a dry, abrasion-resistant film is immediately formed, but is still brittle and picks up dirt and dust during curing. For most all curing operations excluding air is highly impractical and costly. By virtue of the use of a vinyl chloride-vinyl acetate containing copolymer or cellulose ester with pentaerythritol-based polyacrylates in coating films, there are produced semi-dry films on the substrate after solvent removal. Such films are additionally of sufficient stability to be cured hours later in an oxygen containing atmosphere thus eliminating the need for precuring under an inert gas such as nitrogen and are not brittle. Moreover, thin films of from 1 to 10 microns can be produced without loss of abrasion-resistance. As the amount of copolymer or cellulose ester is reduced below certain limits, the abrasion-resistance and dryness of the film is reduced. Coatings containing too low a ratio of pentaerythritol-based polyacrylate to copolymer or cellulose ester tend to lose abrasion-resistance in the cured state because of the lack of sufficient amounts of cross-linked polyacrylate. Coatings containing too high a ratio tend to lose abrasion-resistance in the cured state because of the non-uniform or irregular distribution of the polyacrylate. Coatings cured in an air atmosphere containing no copolymer or cellulose ester for example, are not abrasion-resistant as previously mentioned. Therefore there exists a set of ratio ranges for each type of polyacrylate and cellulose ester or copolymer below which abrasion-resistance in the finally cured coatings may decrease significantly or completely.

In the case of compositions containing pentaerythritol tetraacrylate and a partially hydrolyzed vinyl chloride-vinyl acetate copolymer or cellulose acetate butyrate this ratio should be between about 5 to 1 and about 100 to 1 to achieve abrasion-resistance in the cured coatings. High abrasion-resistance is achieved, in the case of the tetraacrylate and cellulose acetate butyrate at ratios of from about 8 to 1 to about 20 to 1 with optimum abrasion-resistance being achieved at a ratio of about 10 to 1. In the case of the tetraacrylate and partially hydrolyzed copolymer, high abrasion-resistance is achieved at ratios of from about 6 to 1 and 15 to 1 with optimum abrasion-resistance being achieved at a ratio of about 8 to 1. Below or above these ranges, the abrasion-resistance of the cured coatings decreases significantly. To the sprayable coating composition is added the photoinitiator in a ratio of about 1 p.b.w. of photoinitiator to 180 p.b.w. of sprayable solution. If a dipentaerythritol-based polyacrylate is employed the photoinitiator may be excluded.

The sprayable solution is then preferably sprayed on the inside surface of the mold using a conventional low pressure spray gun at a wet film thickness of from about 0.9 to 3.0 mils. Thereafter, the folvents are allowed to evaporate either at room temperature for about 10 minutes or at 100° F. to 120° F. for about 2 minutes.

The mold materials to which the coating compositions are applied are those for which the abrasion-resistant coating has a lower bonding affinity than the cured polymerizable molding compositions. Glass or metal are particularly preferred as the mold material but other materials such as polyolefins, or polytetrafluoro ethylene (Teflon) may also be employed.

The dry coated mold is exposed to actinic radiation to provide a cured coating on the inside surface of the mold of from about 0.1 to about 1.5 mil. in dry film thickness.

Actinic radiation is used herein as electromagnetic radiation having a wavelength of 700 nanometers or less which is capable of producing, either directly or indirectly, free radicals in the photoinitiator which in turn cause cross-linking addition polymerization of the compositions. The most commonly used form of actinic light and the preferred form herein is ultraviolet light, that is, electromagnetic radiation having a wavelength in the range of from about 180 nanometers to about 460 nanometers, although actinic light of greater or shorter wavelengths may also be used. Generally, exposures of from 1 to 5 sec. are sufficient to effect curing.

Any suitable source which emits ultraviolet light may be used in curing the compositions of this invention. Particularly preferred are ultraviolet emitting lamps of the medium mercury vapor type having a power rating of 200 watts/inch.

After curing of the coating compositions in the mold, the polymerizable monomer-containing molding composition is added to the mold. Such compositions generally comprise a liquid ethylenically unsaturated monomer and polymerization initiator. Typical ethylenically unsaturated monomers include methyl and ethyl acrylates and methacrylates, acrylonitrile-butadienestyrene and typical polymerization initiators include azobisisobutyronitrile and benzoyl peroxide. The present method may also be used to coat casted articles made of polycarbonates, polyesters, polyamides, polyepoxides and polyallyl diglycol carbonate for example.

Next, the molding composition is cured usually by heating the mold to a temperature of between 100° and 150° F. to form an article in the shape of the mold. After curing of the molding composition, the cured abrasion-resistance coating, having more bonding affinity for the cured molding composition than the mold transfers from the surface of the mold material to the surface of the cured article and becomes permanently bonded thereto. The article is then removed from the mold.

The invention will be more completely described with reference to the following examples.

EXAMPLE 1

This example demonstrates the coating of a molded article with an abrasion-resistant coating composition according to the method of this invention comprising pentaerythritol tetraacrylate, cellulose acetate butyrate and a photoinitiator.

A stock solution containing 14.3 wt.% of cellulose acetate butyrate in propyl acetate and propanol is first prepared by dissolving 50 parts by weight (p.b.w.) of cellulose acetate butyrate having on the average 37% butyrl groups and 2% hydroxyl groups and a viscosity in seconds of between 17 and 33 in a solvent mixture of 200 p.b.w. of propyl acetate and 100 p.b.w. of propanol. (Viscosity determined by A.S.T.M. Method D-1343-54T in the solution described as Formula A, A.S.T.M. Method D-40 871-54T).

Next, a sprayable clear solution was formed by adding a portion of the above stock solution to a sprayable solvent system comprising propylacetate, propylalcohol, methyl Cellosolve, butanol, butylacetate and methyl isoamyl ketone.

This sprayable solution contained the following total weight percentages of each component.

| Component | Total wt. % |
| --- | --- |
| Pentaerythritol Tetraacrylate | 14.2 |
| Cellulose Acetate Butyrate | 1.4 |
| Propyl Acetate | 16.0 |
| Propyl Alcohol | 13.2 |
| Methyl Cellosolve | 15.6 |
| Butanol | 13.2 |
| Butyl Acetate | 13.2 |
| Methyl Isoamyl Ketone | 13.2 |
| | 100.0 |

To this solution was added 3 p.b.w. of alpha chloroacetyldiphenyloxide to form a UV curable coating composition.

This curable composition was then sprayed on the inside of a glass mold at a wet film thickness of about 0.9 mil. using a DeVilbiss-type EGA spray gun and allowed to dry at room temperature. Upon drying, the film thickness was about 0.2 to 0.3 mil. The mold was then irradiated with high intensity UV light. Into this mold was poured a mixture of methyl methacrylate monomer and benzoyl peroxide (½%). The mold was gradually heated to 150° F. for 24 hours, cooled, and a molded article was removed from the mold having a cured coating thereon. The coating exhibited high abrasion-resistance.

EXAMPLE 2

In this Example, the procedure of Example 1 is applied except that a partially hydrolyzed vinyl chloride-vinyl acetate copolymer containing about 91% combined vinyl chloride, 3% combined vinyl acetate and 6% combined vinyl alcohol is substituted for the cellulose acetate butyrate of Example 1. The stock solution should contain about 15 wt.% of the copolymer.

A sprayable solution containing the following total weight percentages of each component can be prepared from the stock solution which can be applied as in Example 1.

| Component | Total wt. % |
| --- | --- |
| Pentaerythritol Tetraacrylate | 14.81 |
| Partially Hydrolyzed Copolymer | 1.86 |
| Propyl Acetate | 18.51 |
| Propyl Alcohol | 9.26 |
| Methyl Cellosolve | 18.51 |
| Butanol | 9.26 |
| Butyl Acetate | 18.51 |
| Methyl Isoamyl Ketone | 9.26 |
| | 99.98 |

After removing the article from the mold the coating thereon was highly abrasion-resistant.

I claim:

1. A method of forming an abrasion-resistant coating on molded polymeric articles formed by curing a polymerizable monomer-containing molding composition in a mold comprising:

(a) applying to said mold a coating composition curable by actinic radiation comprising a pentaerythritol-based polyacrylate or polymethacrylate and a cellulose ester or a vinyl chloride-vinyl acetate containing copolymer;

(b) exposing said coating composition to actinic radiation to form a cured coating on said mold;

(c) adding to the mold a heat polymerizable monomer-containing molding composition; and
(d) polymerizing said molding composition in the form of a molded article, said cured coating transferring to the surface of said molded article.

2. The method of claim 1 wherein said pentaerythritol-based polyacrylate is pentaerythritol tetraacrylate.

3. The method of claim 2 wherein said cellulose ester is cellulose acetate butyrate.

4. The method of claim 1 wherein said vinyl chloride-vinyl acetate containing copolymer is a partially hydrolyzed vinyl chloride-vinyl acetate copolymer containing from about 50% to 95% combined vinyl chloride monomer, from about 2% to about 35% combined vinyl acetate monomer and from about 3% to about 25% combined vinyl alcohol.

5. The method of claim 4 wherein said partially hydrolyzed vinyl chloride-vinyl acetate copolymer contains 91% combined vinyl chloride, 3% combined vinyl acetate and 6% combined vinyl alcohol.

6. The method of claim 1 which further comprises a photoinitiator.

7. The method of claim 6 wherein said photoinitiator is alphachloro acetyl diphenyloxide.

8. The method of claim 1 wherein said coating composition is applied to said mold by spraying.

9. A method of forming a coating on a molded polymeric article formed by curing a polymerizable monomer-containing molding composition in a mold comprising:
(a) applying to said mold a coating composition curable by actinic radiation comprising pentaerythritol tetraacrylate, cellulose acetate butyrate or a partially hydrolyzed vinyl chloride-vinyl acetate copolymer containing from about 50% to 95% combined vinyl chloride monomer, from about 2% to about 35% combined vinyl acetate monomer and from about 3% to about 25% combined vinyl alcohol and a photoinitiator;
(b) exposing said coating to actinic radiation to form a cured coating on said mold;
(c) adding to the mold a polymerizable monomer-containing molding composition; and
(d) polymerizing said molding composition in the form of a molded article, said cured coating bonding to the surface of said molded article.

* * * * *